(12) United States Patent
Le Pezennec et al.

(10) Patent No.: US 9,065,515 B2
(45) Date of Patent: Jun. 23, 2015

(54) METHOD AND SYSTEM FOR ENHANCED TRANSMISSION IN MOBILE COMMUNICATION NETWORKS

(75) Inventors: Yannick Le Pezennec, Madrid (ES);
Miguel Arranz Arauzo, Madrid (ES);
Brendan McWilliams, Madrid (ES);
Javier Lopez Roman, Madrid (ES);
Julio Urbano Ruiz, Madrid (ES);
Santiago Tenorio Sanz, Madrid (ES)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 433 days.

(21) Appl. No.: 13/252,896

(22) Filed: Oct. 4, 2011

(65) Prior Publication Data

US 2012/0113840 A1   May 10, 2012

(30) Foreign Application Priority Data

Oct. 4, 2010 (EP) .................................... 10382262

(51) Int. Cl.
*H04B 7/06* (2006.01)
*H04B 7/04* (2006.01)
*G08C 15/00* (2006.01)
*H04B 7/10* (2006.01)

(52) U.S. Cl.
CPC .............. *H04B 7/0658* (2013.01); *G08C 15/00* (2013.01); *H04B 7/0417* (2013.01); *H04B 7/0671* (2013.01); *H04B 7/0682* (2013.01); *H04B 7/0469* (2013.01); *H04B 7/10* (2013.01); *H04B 7/0473* (2013.01)

(58) Field of Classification Search
CPC ....................................................... G08C 15/00
USPC ........................................................ 370/252
See application file for complete search history.

(56) References Cited

U.S. PATENT DOCUMENTS

| | | | |
|---|---|---|---|
| 2005/0053169 A1* | 3/2005 | Jia et al. ........................ | 375/267 |
| 2007/0041457 A1* | 2/2007 | Kadous et al. ................ | 375/260 |
| 2009/0086861 A1* | 4/2009 | Yavuz et al. .................. | 375/346 |
| 2011/0122962 A1* | 5/2011 | De Pasquale et al. ........ | 375/267 |
| 2011/0149780 A1* | 6/2011 | Bollea et al. .................. | 370/252 |
| 2012/0140801 A1* | 6/2012 | Asplund et al. ............... | 375/219 |
| 2014/0307833 A1* | 10/2014 | Abbasfar et al. .............. | 375/305 |

FOREIGN PATENT DOCUMENTS

EP         10382262.3        2/2011

OTHER PUBLICATIONS

Nokia Siemens Networks, HSDPA MIMO Codebook Restriction, 3GPP Draft, R1-095074, 3rd Generation Partnership Project (3GPP) Mobile Competence Centre, 650, Route Des Lucioles, F-06921 Sophia-Antipolis Cedex, France, No. Jeju, 20091109, Nov. 9, 2009 (Nov. 9, 2009), XP050389410, [Retrieved on Nov. 13, 2009], pp. 1-3.
Francisco Dominguez, Santiago Tenorio, and Julio Urbano, Circular Polarization Benefits in HSDPA and MIMO Networks (EuCAP 2010), Antennas and Propagation (EUCAP), 2010 Proceedings of the fourth European conference on, IEEE, Piscataway, NJ, USA, Apr. 12, 2010 (Apr. 12, 2010), pp. 1-5, XP031705789.

* cited by examiner

*Primary Examiner* — Christopher R Crompton
(74) *Attorney, Agent, or Firm* — Workman Nydegger (57) ABSTRACT

Method and system for improving the performance of mobile communication networks. The method and system employs the additional functionality whereby an additional phase offset can be applied to one of the physical paths (one physical antenna) in order to modify and adapt the transmit polarization. In the preferred embodiment, the criterion for selecting the additional phase offset will be to maximize the energy received from the HSPA serving cell by the legacy HSDPA user equipments.

21 Claims, 11 Drawing Sheets

Fig. 1

(Prior Art)

METHOD AND SYSTEM FOR ENHANCED TRANSMISSION IN MOBILE COMMUNICATION NETWORKS

CROSS REFERENCE TO RELATED APPLICATIONS

This application claims priority to and the benefit of European Patent Application No. EP 10382262.3, filed Oct. 4, 2010, which is incorporated herein by reference in its entirety.

FIELD OF THE INVENTION

The present invention relates to wireless communications and more specifically to an enhanced transmission method and system for mobile communication networks.

BACKGROUND OF THE INVENTION

The enhanced transmission method and system proposed in the present invention could be used in any network using 2G or 3G Technology, 2G LTE (Long Term Evolution), WIMAX, HSDPA technology, and generally speaking to any wireless transmission technology. It is especially useful in mobile networks systems using Multiple Input-Multiple Output, MIMO, technique Multiple-input Multiple-output (MIMO) techniques are well known and they are used in wireless networks, including 3G Mobile networks.

In MIMO systems, both the transmitter and the receiver are equipped with multiple antennas in order to improve the system performance. In particular, the use of MIMO systems represents a useful solution for improving the capacity and user throughput performance of the networks.

The basic MIMO feature as standardised in 3GPP Release 7 is based on two transmitter antennas (at the node B) and two receiving antennas (at the UE) using a single carrier. At the transmitter, the data can be split into one or two data streams and transmitted through the two antennas using the same radio resource (i.e. same transmission time interval and HSDPA codes). In a generic downlink transmitter structure to support MIMO operation the primary and secondary transport blocks are each processed (channel coding and interleaving), then spread, subsequently weighted by precoding weights. Finally, the resulting channels after MIMO precoding (i.e. MIMO channel#1 and MIMO channel#2) are mapped onto P-CPICH and S-CPICH (Primary and secondary common pilot channels), respectively before being provided to the first and second physical antennas respectively.

The two streams of data are recovered by the UE from the signals received via its two antennas (Rx Diversity). Thus, for the MIMO feature to work both the network and the terminals need to be MIMO-enabled. In order to deploy MIMO and transmit two parallel data streams, two power amplifiers are required per sector (one for each of the two antennas. In order not to use an entire carrier for MIMO only (5 MHz), it is more efficient and practical to use the same carrier for MIMO devices as used for non-MIMO devices (e.g. HSDPA legacy terminals).

Another technique frequently used to improve the performance of 3G wireless networks is the High-Speed Downlink Packet Access HSDPA technology. HSDPA is a packet-based data service in third generation (3G) W-CDMA (Wideband Code Division Multiple Access) systems, which provides high-speed data transmission (with different download rates e.g. 7.2/10.8/16.2/21.6 Mbps over a 5 MHz bandwidth) to support multimedia services.

HSDPA comprises various versions with different data speeds and features. The following table is derived from table 5.1a of the release 9 version of 3GPP TS 25.306 and shows maximum speeds of different device classes and the combination of features they support.

TABLE 1

HS-DSCH physical layer categories

| HS-DSCH category | Maximum number of HS-DSCH codes received | Max. data rate [Mbit/s] | Maximum number of bits of an HS-DSCH transport block received within an HS-DSCH TTI | Total number of soft channel bits | Supported modulations without MIMO operation or dual cell operation | Supported modulations simultaneous with MIMO operation and without dual cell operation | Supported modulations with dual cell operation | Supported modulations simultaneous dual cell and MIMO operation |
|---|---|---|---|---|---|---|---|---|
| Category 1 | 5 | 1.2 | 7298 | 19200 | QPSK, 16QAM | Not applicable (MIMO not supported) | Not applicable (dual cell operation not supported) | Not applicable (simultaneous dual cell and MIMO operation not supported) |
| Category 2 | 5 | 1.2 | 7298 | 28800 | | | | |
| Category 3 | 5 | 1.8 | 7298 | 28800 | | | | |
| Category 4 | 5 | 1.8 | 7298 | 38400 | | | | |
| Category 5 | 5 | 3.6 | 7298 | 57600 | | | | |
| Category 6 | 5 | 3.6 | 7298 | 67200 | | | | |
| Category 7 | 10 | 7.2 | 14411 | 115200 | | | | |
| Category 8 | 10 | 7.2 | 14411 | 134400 | | | | |
| Category 9 | 15 | 10.1 | 20251 | 172800 | | | | |
| Category 10 | 15 | 14.0 | 27952 | 172800 | | | | |
| Category 11 | 5 | 0.9 | 3630 | 14400 | QPSK | | | |
| Category 12 | 5 | 1.8 | 3630 | 28800 | | | | |
| Category 13 | 15 | 17.6 | 35280 | 259200 | QPSK, 16QAM, 64QAM | | | |
| Category 14 | 15 | 21.1 | 42192 | 259200 | | | | |
| Category 15 | 15 | 23.4 | 23370 | 345600 | | QPSK, 16QAM | | |
| Category 16 | 15 | 28.0 | 27952 | 345600 | | | | |
| Category 17 | 15 | — | 35280 | 259200 | QPSK, 16QAM, 64QAM | — | | |
| | | | 23370 | 345600 | — | QPSK, 16QAM | | |

TABLE 1-continued

HS-DSCH physical layer categories

| HS-DSCH category | Maximum number of HS-DSCH codes received | Max. data rate [Mbit/s] | Maximum number of bits of an HS-DSCH transport block received within an HS-DSCH TTI | Total number of soft channel bits | Supported modulations without MIMO operation or dual cell operation | Supported modulations simultaneous with MIMO operation and without dual cell operation | Supported modulations with dual cell operation | Supported modulations simultaneous dual cell and MIMO operation |
|---|---|---|---|---|---|---|---|---|
| Category 18 | 15 | — | 42192 | 259200 | QPSK, 16QAM, 64QAM | — | | |
| | | | 27952 | 345600 | — | QPSK, 16QAM | | |
| Category 19 | 15 | 35.3 | 35280 | 518400 | QPSK, 16QAM, 64QAM | | | |
| Category 20 | 15 | 28.0 | 42192 | 518400 | | | | |
| Category 21 | 15 | 42.2 | 23370 | 345600 | — | — | QPSK, 16QAM | |
| Category 22 | 15 | 42.2 | 27952 | 345600 | | | | |
| Category 23 | 15 | 23.4 | 35280 | 518400 | | | QPSK, 16QAM, 64QAM | |
| Category 24 | 15 | 28.0 | 42192 | 518400 | | | | |
| Category 25 | 15 | 35.3 | 23370 | 691200 | — | — | — | QPSK, 16QAM |
| Category 26 | 15 | 42.2 | 27952 | 691200 | | | | |
| Category 27 | 15 | 46.7 | 35280 | 1036800 | — | — | — | QPSK, 16QAM, 64QAM |
| Category 28 | 15 | 55.9 | 42192 | 1036800 | | | | |

In order to reach yet higher peak rates (i.e. 28.8 Mbps with 3GPP Release 7), the MIMO (Multiple Input Multiple Output) feature is used in HSDPA. MIMO technology is an important step in the evolution of HSDPA, as it provides higher data rates in downlink whilst further improving spectrum efficiency.

When introducing MIMO in a system, it is indispensable to have two transmission branches (RF chains), including two power amplifiers each one connected to the physical antenna. In order to optimise the usage of the power resource it is highly desirable to balance the power between the two power amplifiers. Whilst MIMO channels are intrinsically perfectly power balanced, all the remaining channels need to be transmitted with equal power by each power amplifier. To this end, two techniques can be used: a first one is the use of transmission diversity (using "Space Time Transmit Diversity" (STTD) for all non-MIMO channels except for the Synchronisation Channel for which "Time Switch Transmit Diversity" (TSTD) is used). Another technique is referred to as Virtual Antenna Mapping (VAM) in this description and is discussed herein after.

Another key requirement is to make sure that the technique used to power balance the non-MIMO channels allows the same performance as would be achieved with the same energy using a single power amplifier. STTD was defined by 3GPP (Release '99) in order to achieve this. However in practice this feature has been found to affect the performance of certain legacy user equipments. In particular HSDPA UEs with equalizer receivers can be severely impacted. This is due to the time transformation which is performed by STTD, which is ill-adapted to an optimum equalization process. Some HSDPA devices have been found to deactivate their equalizer for this reason. Field tests have shown that the impact of the use of STTD on the throughput of data received by an HSDPA category 8 device (especially for a type 2 receiver i.e. a single antenna equalizer receiver) is particularly negative under good and medium radio conditions.

Figure 1:
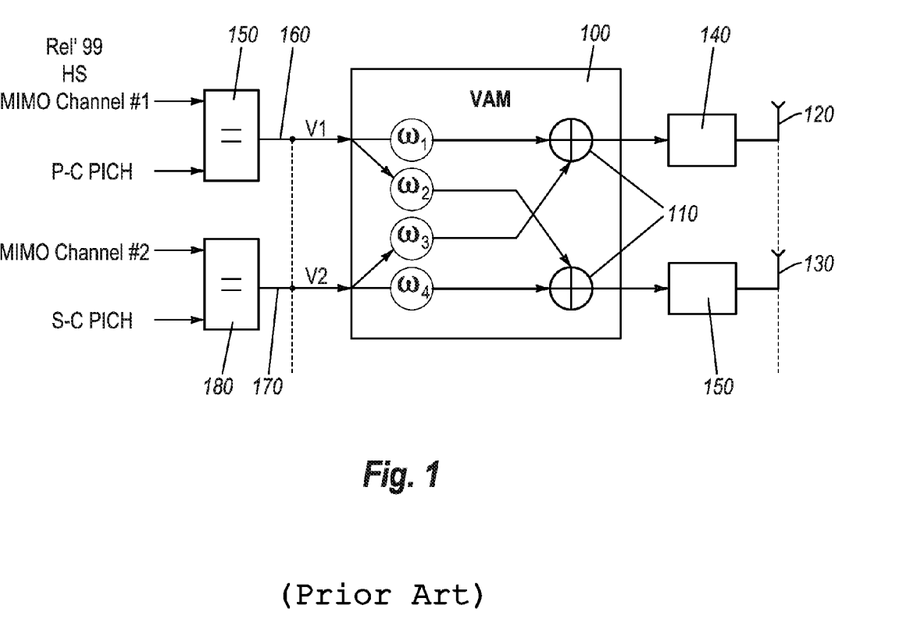
FIG. 1 shows an exemplary embodiment of the prior art VAM technique.
Figure 11:
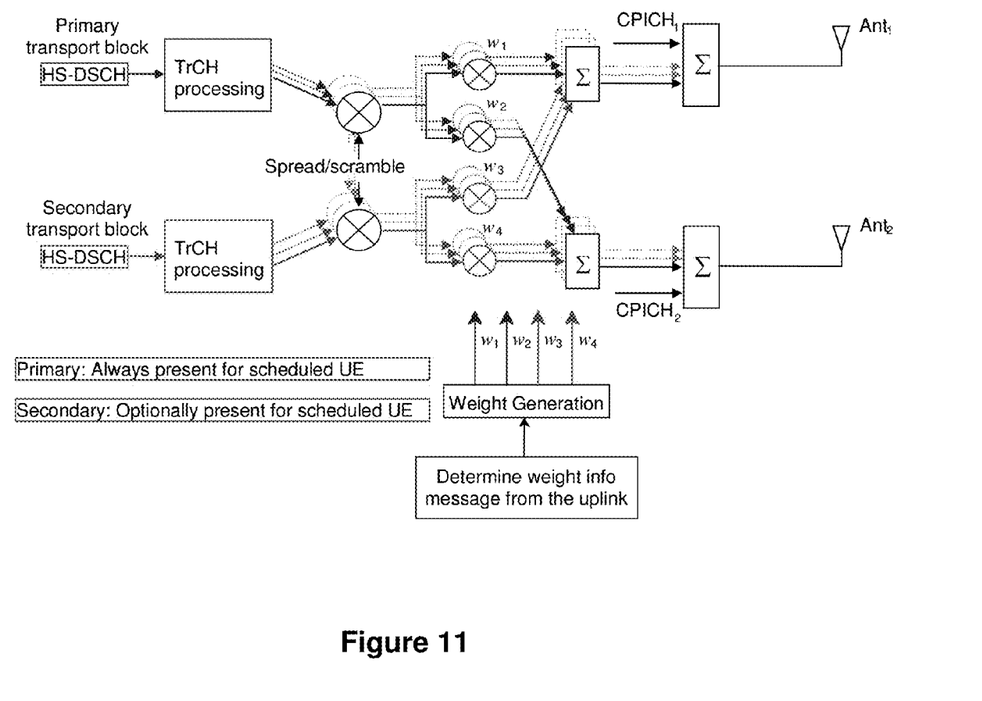
FIG. 11 shows an illustrative scheme of how the precoding from MIMO is done before MIMO signals are processed by the VAM matrix.

Virtual Antenna Mapping is an alternative which is aimed at solving this issue fulfilling both above-mentioned requirements. Hence, this technique enables power balancing of the power amplifiers whilst not impacting on the performance of legacy users. The principle of the VAM technique is depicted in FIG. 1. The VAM operation/function 100 can be performed as a baseband function after the mapping onto physical channels for Rel'99 and HSDPA and after precoding for MIMO. The VAM operation/function can also be implemented in logic in a radio unit such as a Remote Radio Head (RRH). The signals shown at the input of adding operations 150 are the following: Rel'99 refers to the dedicated channel (DCH) which can carry voice or data traffic. It refers to HSDPA SIMO (Single Input Multiple Output, i.e. HSDPA without MIMO). MIMO Channel #1 is the resulting channel after MIMO precoding operation as can be seen in FIG. 11 consisting of the sum of the primary data stream and the secondary data stream weighted with their correspondent weights, and MIMO Channel #2 is the resulting channel after MIMO precoding operation as can be seen in FIG. 11 consisting of the sum of the primary data stream and the secondary data stream with their correspondent weights. VAM consists of mapping input signals onto the physical antennas with specific weights for each path. VAM can be seen as a matrix of four weights $\omega_1$, $\omega_2$, $\omega_3$, $\omega_4$ and two adders 110 applied to two input signals fed by "virtual antennas" 160, 170 corresponding to the physical antennas depicted in FIG. 1, showing the MIMO operation. The force of the virtual antenna concept is that the UE behaves as if the signals present at the virtual antennas are the ones actually transmitted, although the physical antennas radiate something different. The legacy UE (not supporting MIMO) will only see the virtual antenna 160. Whilst its signal will be transmitted on both physical antennas the UE receiver will act as if transmitted from one (the mapping between virtual and physical antennas is transparent for the user equipment). The configuration received by the legacy user is the same as in a single antenna transmission system, the user equipment is not configured for any form of transmit diversity at RRC level. The MIMO UE will see both virtual antenna 160 and virtual antenna 170 and is unaware of the mapping between the virtual and physical antennas, which is transparent to the MIMO operation.

The four weights from the VAM matrix are differentiated by phases only as equal amplitude is required to achieve power balancing between the two physical antennas 120,130. A first power amplifier 140 and a second power amplifier 150 are configured for amplifying the output signals after the VAM function before they are radiated by the physical antennas 120,130. The weights of the VAM matrix are fixed. They are configured for the whole cell and set by Operation & Maintenance (O&M) and typically not changed very often. The VAM weights fulfil totally different objectives than the MIMO precoding weights—the latter ones being variable weights (that can change every 2 ms) used only for the purpose of the MIMO transmission whilst VAM applies to all channels and has as objective to fulfil the two requirements highlighted above.

From the legacy user point of view the VAM technique is like a single antenna transmission, i.e. the user terminal demodulates the HSDPA signal as if there were no Transmission diversity in the system. Seen from the transmit side for legacy non-MIMO users, VAM amounts to transmitting the same signal (common channel, Rel'99 and HSDPA non-MIMO) on the two transmit antenna ports but with a different phase.

However, from extensive field testing of VAM functionality (measurements over a large amount of static points which statistically shows the impact of VAM), the following results have been obtained:

When there is no concurrent HSDPA and active MIMO user equipments e.g. only HSDPA (non-MIMO) user equipments in the cell, VAM has little or no impact on HSDPA performance i.e. throughputs observed of HSDPA user equipments with VAM active are nearly the same as the throughputs of HSDPA without VAM (single antenna transmission as in most 3G networks today).

The performance of MIMO with VAM is also very similar to the performance of MIMO with Tx diversity (STTD).

However whenever there is concurrent HSDPA and MIMO traffic, it has been observed that the performance of HSDPA legacy devices is impacted negatively by around 10% for a legacy type 3 device (Rx diversity and equalizer implemented in receiver) and by around 15-20% for a legacy type 2 HSDPA device (no Rx diversity, only equalizer implemented in receiver) whenever the secondary pilot is present in the second virtual antenna and more degradation is observed whenever the MIMO user is fully active with continuous downloads.

Hence, it is shown that even though the VAM technique has a better performance than previously used techniques such as STTD, it has still a negative impact in HSDPA legacy devices when there is concurrent HSDPA and MIMO traffic.

There is therefore a need in the art for transmission schemes which further improve the performance of legacy HSDPA devices in concurrent HSDPA-MIMO traffic while maintaining the advantages of using VAM techniques.

SUMMARY OF THE INVENTION

The current invention solves the aforementioned problems by disclosing a method and system which employs the additional functionality whereby an additional phase offset can be applied to one of the physical paths (1 physical antenna) in order to modify and adapt the transmit polarization according to at least one predetermined criterion.

In the preferred embodiment the criterion/-a will be to maximize the throughput of the legacy HSDPA devices especially when MIMO users are active or, in other words to maximize the energy received from the High Speed Packet Access (HSPA) serving cell by the legacy HSDPA user equipments.

This enhanced VAM technique permits the introduction of the MIMO HSDPA functionality into the network in as seamless a way as possible for legacy HSDPA user(s), with performance degradation minimized due to either the Secondary Common Pilot Channel or interference from the second virtual antenna.

Figure 2:
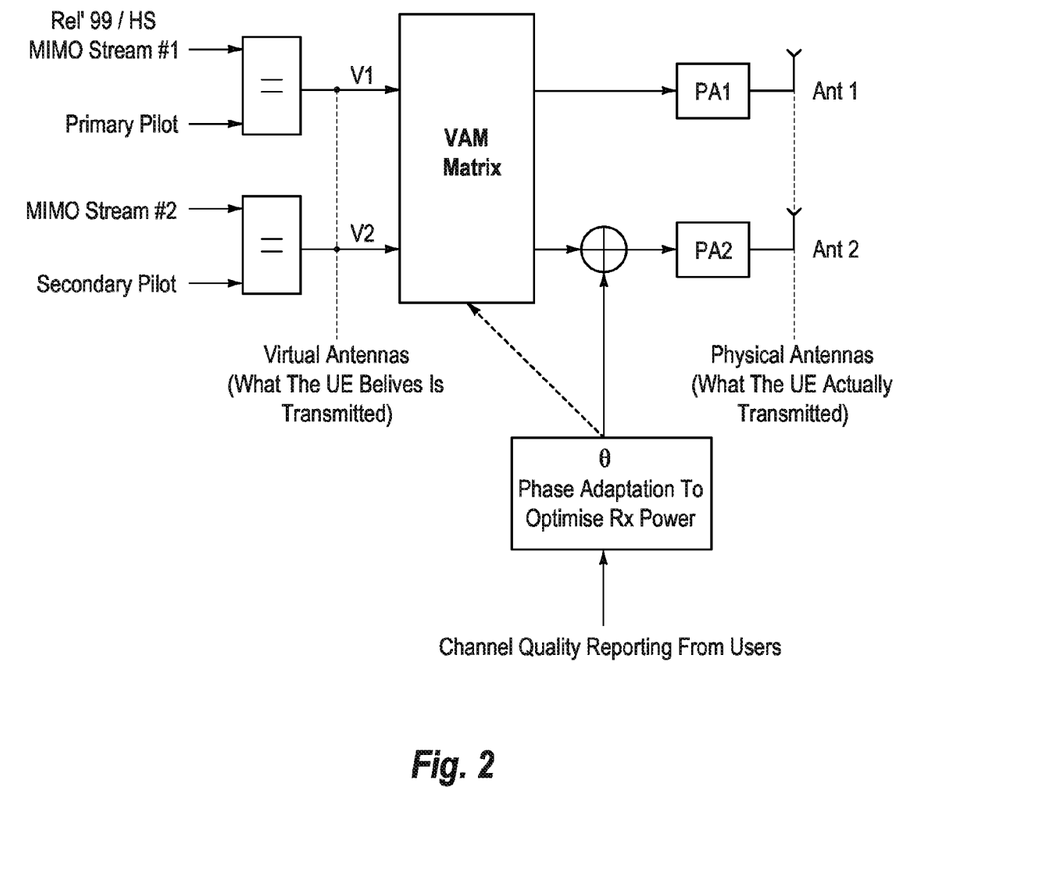
FIG. 2 shows an exemplary embodiment of this enhanced VAM technique proposed in the present invention.

The FIG. 2 shows conceptually how this phase offset can be introduced and controlled digitally in a Node B.

Consequently, according to the invention, a system, method and computer program according to the independent claims are provided. Favourable embodiments are defined in the dependent claims.

According to a first aspect of the invention, a method of operating a transmission system is provided in a mobile communication network, the transmission system comprising a first transmission branch for transmitting a first radio signal by a first physical antenna and a second transmission branch for transmitting a second radio signal by a second physical antenna, characterised in comprising the step of adding an additional phase offset to one of the transmission branches of one of the physical antennas, said additional phase offset being selected according to a certain criterion.

According to a second aspect of the invention, a transmission system is provided for use in a mobile communication network, the transmission system comprising a first transmission branch for transmitting a first radio signal by a first physical antenna and a second transmission branch for transmitting a second radio signal by a second physical antenna, the system being characterized by comprising means for adding an additional phase offset to one of the transmission chains of one of the physical antennas, said additional phase offset being selected according to a certain criterion.

Finally, a computer program comprising computer program code means adapted to perform the above-described method is presented.

For a more complete understanding of the invention, its objects and advantages, reference may be made to the following specification and to the accompanying drawings.

BRIEF DESCRIPTION OF THE DRAWINGS

For the purpose of aiding to better understand the characteristics of the invention according to a preferred practical embodiment thereof and in order to complement this description, the following figures is attached as an integral part thereof, having an illustrative and non-limiting character.

DETAILED DESCRIPTION OF THE INVENTION

The method and system hereby described can be applied, for example, to UMTS 3G mobile networks but other types of networks and systems are not excluded. It could be used in any network using 2G or 3G Technology, 2G LTE (Long Term Evolution), WIMAX, HSDPAs, and generally speaking to any wireless transmission technology.

The present invention refers to a method, system and computer program which improves the networks performance. Especially it improves the performance of legacy High-Speed Downlink Packet Access (HSDPA) devices, above all in cells with HSDPA and MIMO traffic (both technologies sharing the same carrier).

Figure 3:
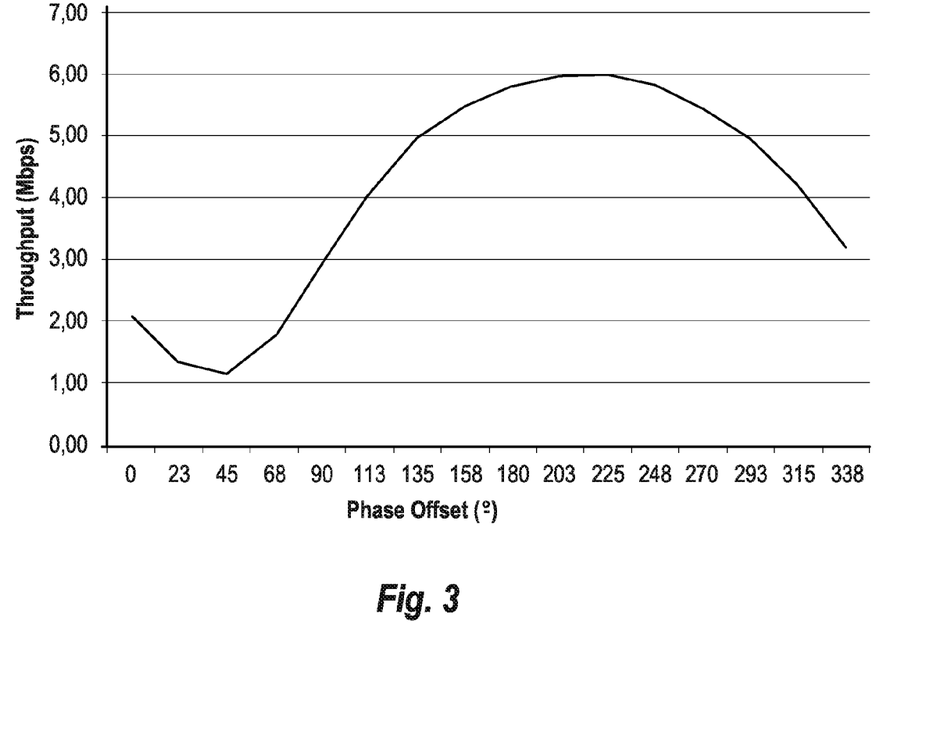
FIG. 3 shows the results of field test with type 2 HSDPA7.2 device in medium radio conditions (static) measuring performance (throughput) according to phase offsets.
Figure 4:
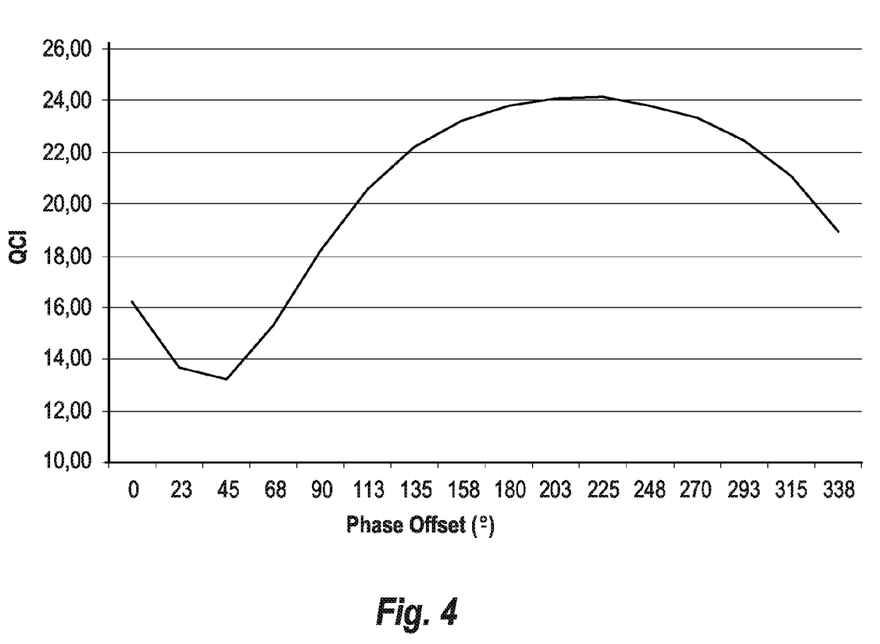
FIG. 4 shows the results of field test with type 2 HSDPA7.2 device in medium radio conditions (static) measuring performance (CQI) according to phase offsets.

With the conventional VAM technique the phase difference between the two physical antennas is not controlled. Even though statistically the effect of VAM (without any concurrent MIMO traffic) is close to null when compared to without VAM (single Tx antenna system) this inherent phase difference has a strong impact on the performance of legacy HSDPA devices as can be seen on FIGS. 3 and 4 showing measurements of performance against phase from field trials of VAM. Hence when applying an adequate phase offset HSDPA performance can be substantially improved with respect to conventional VAM (without phase offset control) and with respect to a conventional single antenna transmission (without VAM). These figures show the impact in terms of throughput and cqi (Channel Quality Information) observed as a function of the phase offset between the two transmit chains.

Bearing in mind the above results obtained, the VAM performance can be improved by making sure the phase difference between the two transmit chains is adjusted dynamically in such a way to provide the best performance in the cell considering all HSDPA user equipments.

Usually, the Circular Polarization is the transmission scheme that maximizes the performance of HSDPA legacy user equipments in addition to mitigating the MIMO interference over them, that is, in most of the cases the phase scheme with the "best performance" would be the circular polarization scheme.

The present invention refers to a method and system that are operable to apply an additional phase offset to one of the physical paths (one physical antenna) in order to modify and adapt the transmit polarization in such a way to maximize the throughput of the legacy HSDPA devices. According to a first embodiment of the invention, the transmission system uses Virtual Antenna Mapping (VAM) which has been explained herein above.

As an embodiment, this phase offset can be introduced and controlled in a Node B (see FIG. 2). In this figure, a phase adaption phase is added to the Virtual Antenna Mapping Module; the phase adaptation is made taking into account the channel quality information reported by the users to the Node B. The phase adaptation could be also taken into account when calculating the VAM matrix, i.e. the phase adaptation is not necessarily an additional entity it can also be made as a part of the existing VAM matrix.

This phase offset is applied at cell or sector level (i.e. applicable to all channels, all services), hence when there is more than one user in the cell, there is a trade-off to be found in order to maximize the throughput of the active legacy HSDPA user equipments. The phase applied can be optimized specifically for the HSDPA user equipments (as opposed to MIMO users), the MIMO user would then remain with same performance as today whilst HSDPA user equipments will see their throughput increase. In this case the cqi information from the MIMO users are ignored, only cqi reports from the HSDPA user equipments are taken into account in the selection of the phase offset to apply after the phase scan. For example in the critical scenario highlighted above where there was one active HSDPA user and one active MIMO user in the cell, the Node B would select the phase that will maximize HSDPA performance (in presence S-CPICH and MIMO second stream if active) i.e. only taking into account the cqi reports from the HSDPA user.

The selection of the phase offset is achieved by performing a phase offset scan across the full range of phase with a defined granularity. During the phase offset scan, the cqi indication from each user is recorded each time a new phase offset is applied in order to identify the optimum phase according to the desired criterion (e.g. maximization of HSDPA user throughput).

In an alternative embodiment, it is not necessary to scan the whole phase range. When the measured quality is above a threshold value ("good enough"" value), the phase offset scan is stopped and the correspondent phase value is selected.

Figure 5:
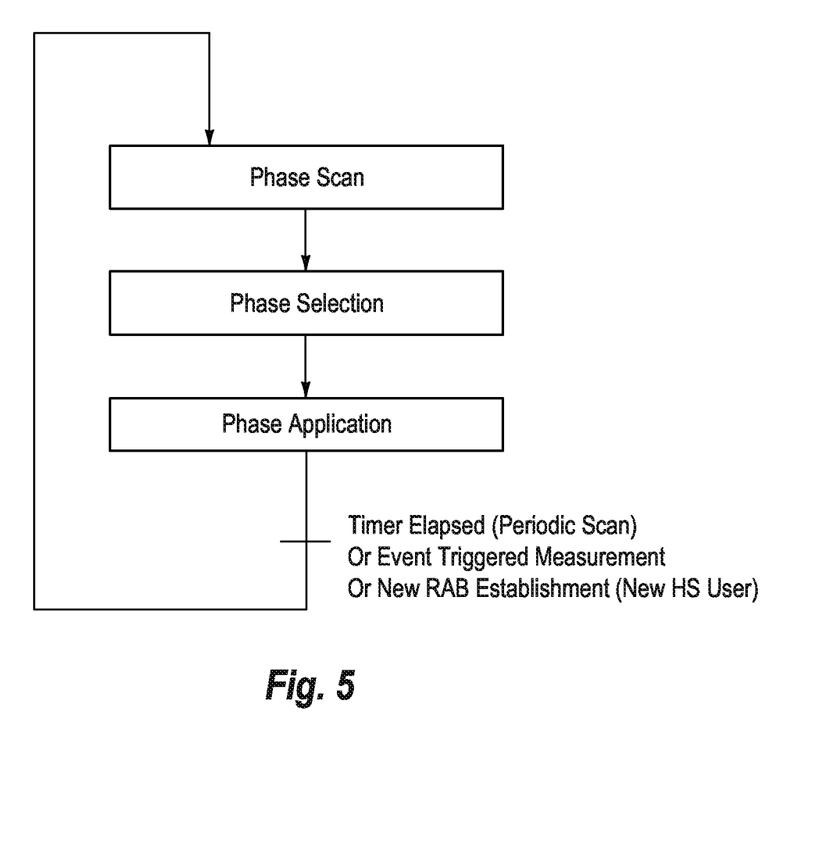
FIG. 5 shows an illustrative scheme of the main steps involved in the phase adaptation process.

The phase adaptation process comprises the following steps (see FIG. 5):

A phase scan (sweep) is made sampling the phase range (usually the 360 degrees range) by given steps of $\Delta\theta$ degrees, measuring the relevant channel quality metrics (preferably cqi but also, CPICH RSCP, and/or Ec/No) for each phase offset. Out of these metrics the cqi is the most important as reported every 2 ms whilst the others are only available on a slow basis (hundreds of ms).

The selection of the phase offset to be applied for the cell as a function of number of the channel quality for each user (preferably only HSDPA user equipments are taken into account) and a given optimisation criterion (cell tput, user tput, QoS)

The selected offset is then applied.

In order to get maximum benefits, the phase scan should be done only when necessary. For example this phase scan could be made:

Periodically during the duration of the HSDPA session (to have updated channel quality information)

When there is a specific event (e.g. when there is a drop in the cqi average across all HSDPA user equipments).

When a new user (preferably a HSDPA user equipments) is active (that is when there is a new Radio Access Bearer, RAB, establishment). To do that, if RRC idle states are in use in the cell, the U-RNTI (UTRAN Temporary Identifier) or any identification of the user should be memorized in order not to repeat the phase scan for the same user.

Combinations of these three criteria are also possible (e.g. when there is a call set-up and periodically).

Figure 6:
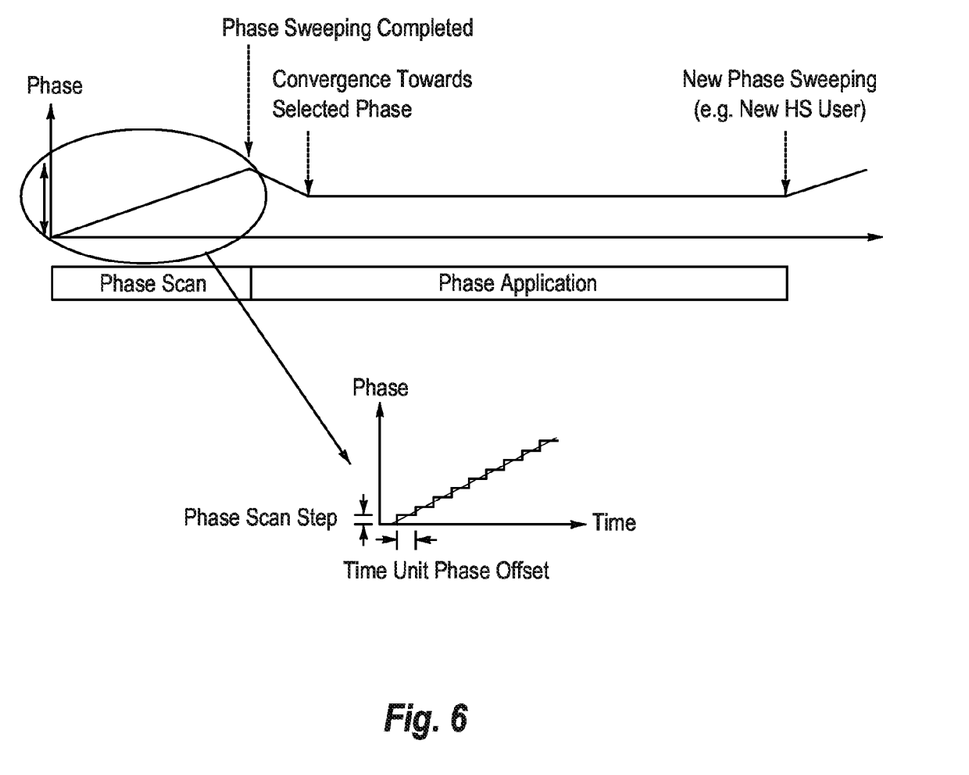
FIG. 6 shows an illustrative scheme of the phase adaptation process with fine scan.

The phase scan could be a fine scan (FIG. 6), that is, almost linear with a small $\Delta\theta$ phase offset steps applied with a small time unit (e.g. slot, TTI, frame level) and fine convergence towards the selected phase or a coarse scan (FIG. 7), that is, big phase offset steps (e.g. four steps of 90°) and no convergence time (direct setup to selected phase after phase scan and larger time unit offset (e.g. 40 ms).

Figure 7:
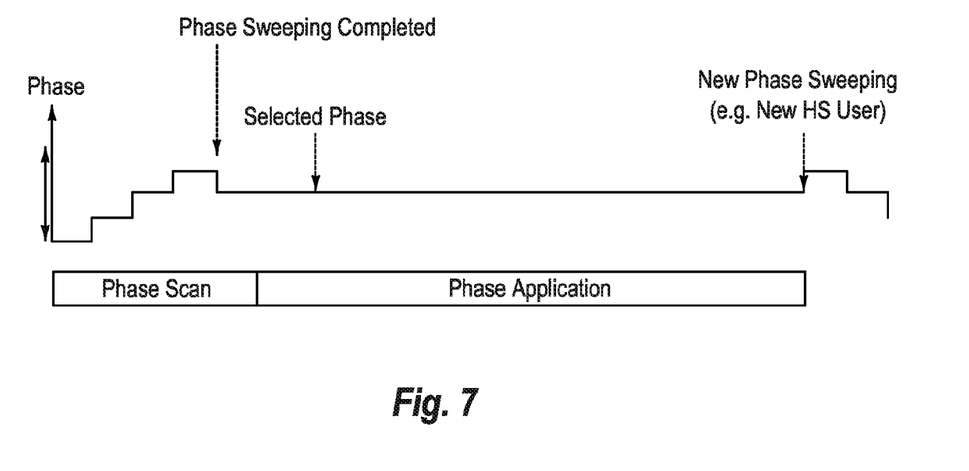
FIG. 7 shows an illustrative scheme of the phase adaptation process with coarse scan.

The coarse scan tests fewer phase offsets but it allows a better channel quality measurement at each phase offset (filtering over more cqi reports allowing more accurate measurements for a given phase offset).

In an alternative embodiment, a combination of coarse and fine scan could be implemented. For example, using a coarse scan at the beginning and once a phase offset is selected, then a fine scan within said selected range will be performed, so a fine adaptation could be obtained with less processing. Or using a coarse scan til the quality measurement is above a threshold value and then, a fine scan is used to allow a better and faster adaptation.

Once the phase range is scanned and channel quality information is obtained for each phase offset, the phase offset to be used is selected, that is the optimum phase is identified according to the desired criteria (e.g. maximization of HSDPA user throughput).

Figure 8:
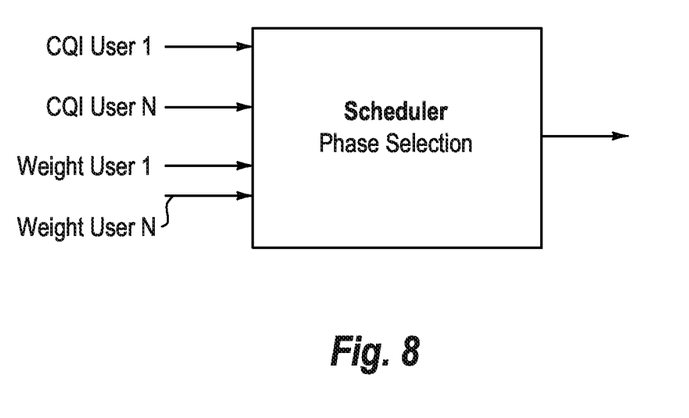
FIG. 8 shows an illustrative scheme of the phase selection process.

One possible criterion to be applied is the Maximum HSDPA aggregated user throughput, shown in FIG. 8. This criterion consists in selecting the phase offset which maximizes equation 1

$$\frac{1}{N} \cdot \sum_{i=1}^{N} CQI_i \cdot \omega_i \quad (1)$$

Where $\omega_i$ is the QoS weight associated to user i (if QoS is not applied then all weights are equal to 1 by default), $CQI_i$ corresponds to the average CQI of user i (channel quality information) over the time period where the phase offset is applied and N is the number of users considered. This equation is applied to the different phase offset scanned and the phase offset for which the result if highest (highest cqi averaged across users) is selected.

MIMO users (through either a weight equal to 0 or simply not considering MIMO users in the above equation) and highly mobile HSDPA user equipments can be discarded in the phase selection process (e.g. through cqi filtering) as for these users the benefit of the phase adaptation is small whilst resulting in worsened performance for HSDPA static user equipments.

Instead of CQI, other alternative parameters can be taken into account to select the phase as CPICH (Control Pilot Channel) RSCP (Received signal code Power), CPICH Ec/No, NACK info. The drawback of these is a slower adaptation of the phase as the phase scan would have to be longer, however once selecting the phase it is not necessary to have very frequent updates of the phase hence this approach is possible.

Also reusing criterion from equation (1), alternative approaches can be taken for the phase adaptation:
Best Polarisation Selection. In this approach the phase is fixed to the selected phase according to output of algorithm (1) and the phase tracking is stopped (no phase scan, no new phase selection) during Timer T_phase_lock, which can take values up to infinite (fixed phase). With this approach a minimum number of HSDPA user equipments might be require to ensure that the phase offset selected is reliable enough for the cell, hence one possibility is to only make the phase lock (during timer) really active once the phase adaptation has been run over a sufficient number of HSDPA user equipments to ensure the stability of the phase offset selected. This approach relies on the fact that there is one better phase offset which provides an optimum throughput for the majority of HSDPA user equipments in the cell hence there is no need to run continuously the phase adaptation as the selected phase would be always the same (within a small margin e.g. +/−1 phase offset step). Through the selection of the phase offset maximizing the average cqi the best polarization is indirectly selected and maintained during Timer_T_phase_lock. This timer allows to recalibrate the system after drift could have occurred in the transmit chains causing the selected phase offset to be suboptimal after some time.

Circular Polarisation Selection: The phase is selected so that a circular polarization is obtained. If the above algorithm (1) is run for N HSDPA user equipments with equal weights ($\omega_i=1$) and the phase is fixed to the selected phase according to output of algorithm (1) and the phase tracking is stopped, the resulting polarization maximizing the HSDPA throughput is expected to be the circular polarization as seen from the majority of active users in the cell. So this is usually the process implemented in order to get circular polarization.

Figure 9:
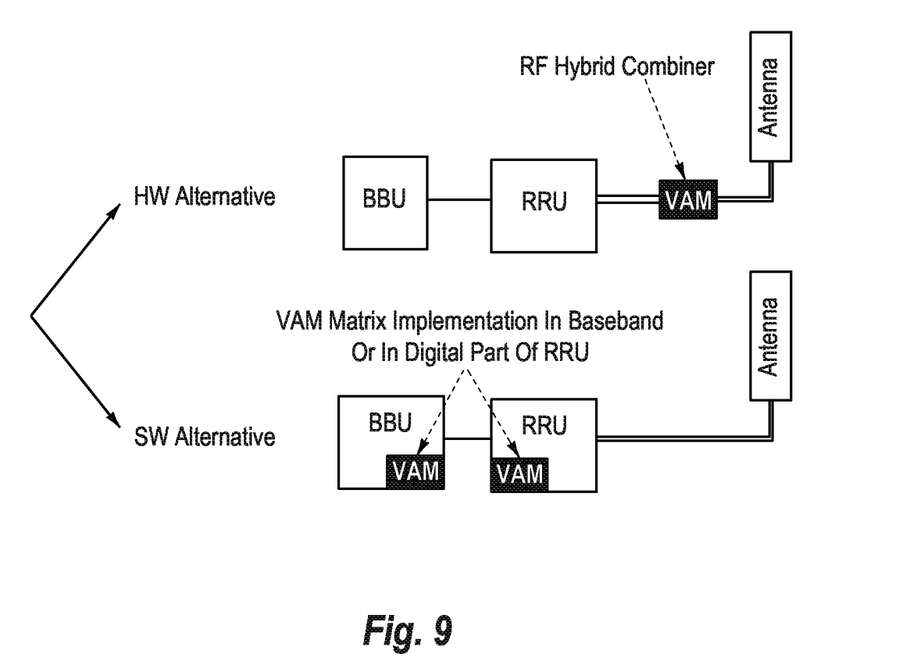
FIG. 9 shows an illustrative scheme of the conventional VAM implementation in the network.
Figure 10:
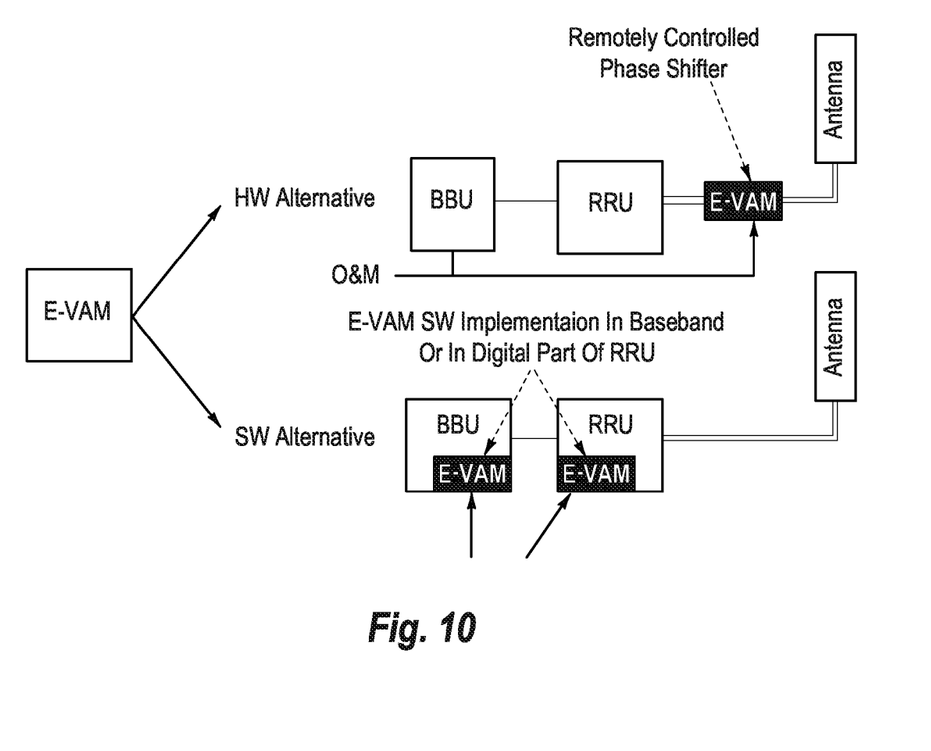
FIG. 10 shows an illustrative scheme of the conventional E-VAM implementation in the network.

As the conventional Virtual Antenna Mapping (see FIG. 9), this Enhanced Virtual Antenna Mapping (with the phase adaptation process) could be hardware or software implemented (see FIG. 10).

In the case of hardware implementation, the Enhanced process (E-VAM) is controlled remotely as part of the O&M procedure. In the case of software implementation, the E_VAM preferably could be implemented in the baseband unit (BBU) or in logic in the Remote Radio Unit (RRU) of the Node B.

The described method can be fully implemented in the base station, alternatively, another network element could take part of the procedure (based on the CQI user information reported by the node B). The matters defined in this detailed description are provided to assist in a comprehensive understanding of the invention. Accordingly, those of ordinary skill in the art will recognize that variation changes and modifications of the embodiments described herein can be made without departing from the scope of the invention. Also, description of well-known functions and elements are omitted for clarity and conciseness.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method of operating a Virtual Antenna Mapping (VAM) transmission system in a mobile communication network using multiple input, multiple output (MIMO) functionality, the VAM transmission system comprising a first transmission branch for transmitting a first radio signal by a first physical antenna and a second transmission branch for transmitting a second radio signal by a second physical antenna, the method comprising:
   generating the first radio signal by taking a weighted sum of a primary data stream and a secondary data stream, using a first set of weights;
   generating the second radio signal by taking a weighted sum of the primary data stream and the secondary data stream, using a second set of weights, wherein a phase offset is present between the first radio signal and the second radio signal;

receiving channel quality information from multiple user equipments operating in the mobile communication network;

adding an additional phase offset to at least one of the first radio signal and the second radio signal, the additional phase offset being selected according to at least one criterion based on the channel quality information; and transmitting the first radio signal with the first physical antenna and transmitting the second radio signal with the second physical antenna.

2. The method according to claim 1, wherein the at least one criterion is based on one or more of: the channel quality information reported by users of the mobile communication networks, Control Pilot Channel Received Signal Code Power, Control Pilot Channel $E_cN_0$, and NACK information.

3. The method according to claim 1, wherein the mobile communication network comprises a High Speed Packet Access (HSPA) serving cell and at least one User Equipment (UE) using a legacy High Speed Downlink Packet Access (HSPDA) functionality, wherein the at least one criterion is to maximize energy received from a HSPA serving cell by at least one legacy HSDPA user equipment.

4. The method according to claim 1, wherein the VAM transmission system is configured to balance power between the first and second transmission branches.

5. The method according to claim 1, wherein adding an additional phase offset comprises:
a) making a phase scan, sampling a phase range by given steps of $\Delta\theta$ degrees and measuring quality for each phase offset;
b) selecting the phase offset to be applied for the cell as based on the at least one criterion comprising a function of a measured quality and a given optimization criterion; and
c) applying the selected phase offset to one of the transmission chains.

6. The method according to claim 5, wherein the optimization criterion consists of selecting the Phase which maximizes a value of a formula $$\frac{1}{N} \cdot \sum_{i=1}^{N} CQI_i \cdot \omega_i$$

where $\omega_i$ is the weight associated to user i, $CQI_i$ corresponds to the CQI (channel quality information) reported by user i and N is the number of users considered.

7. The method according to claim 6, wherein only quality information reported by HDSPA user equipments is taken into account for the phase selection.

8. The method according to claim 5, wherein the phase scan and phase offset selection is made:
periodically during the duration of the HSDPA session and additionally triggered when there is a new call setup or any other specific event which leads a data user to be in active mode.

9. The method according to claim 1, wherein the method is implemented in the baseband unit (BBU) of a Node B or in logic in the Remote Radio Unit (RRU) of a Node B.

10. The method according to claim 1, wherein the method is hardware implemented outside the Node B and is controlled as part of an O&M procedure.

11. The method according to claim 1, wherein the at least one criterion by which the phase offset is selected is such that a circular polarization is obtained.

12. The method of claim 1, further comprising selecting the additional phase offset according to at least one criterion based on an average of the channel quality information received from the multiple user equipments.

13. A Virtual Mapping Antenna (VAM) transmission system for use in a mobile communication network using multiple input, multiple output (MIMO) functionality, the VAM transmission system comprising:
a first transmission branch for transmitting a first radio signal by a first physical antenna, the first radio signal being generated by taking a weighted sum of a primary data stream, and a secondary data stream, using a first set of weights and;
a second transmission branch for transmitting a second radio signal by a second physical antenna, the second radio signal being generated by taking a weighted sum of the primary data stream and the secondary data stream, using a second set of weights; and
the VAM transmission system is configured to receive channel quality information from multiple user equipments operating in the mobile communication system and dynamically adjust a phase difference between the first radio signal and the second radio signal by accounting for at least one criterion based on the channel quality information,
wherein the first radio signal is transmitted with the first physical antenna and the second radio signal is transmitted with the second physical antenna.

14. The system according to claim 13, the system further comprising means for adding an additional phase offset, the means for adding an additional phase offset comprising:
a) scanning means for making a phase scan, sampling a phase range by given steps of $\Delta\theta$ degrees and measuring quality for each phase offset;
b) selecting means for selecting the phase offset to be applied for the cell as a function of the measured quality and a given optimization criterion; and
c) applying means for applying the selected phase offset to one of the transmission chains.

15. A network element comprising the VAM transmission system according to claim 13.

16. The network element according to claim 15 where the network element is a Node B.

17. The system according to claim 13, wherein the VAM transmission system is further configured to adjust the phase difference by accounting for at least one criterion based on an average of the channel quality information received from the multiple user equipments.

18. A non-transitory computer readable medium having stored thereon computer executable instructions that when executed by a processor cause a computing system to perform a method of operating a Virtual Antenna Mapping (VAM) transmission system in a mobile communication network using multiple input, multiple output (MIMO) functionality, the VAM transmission system comprising a first transmission branch for transmitting a first radio signal by a first physical antenna and a second transmission branch for transmitting a second radio signal by a second physical antenna, the method comprising:
generating the first radio signal by taking a weighted sum of a primary data stream and a secondary data stream, using a first set of weights;
generating the second radio signal by taking a weighted sum of the primary data stream and the secondary data stream, using a second set of weights;

receiving channel quality information from multiple user equipments operating in the mobile communication network;

adding an additional phase offset to one of the first radio signal and the second radio signal, the additional phase offset being selected according to at least one criterion based on the channel quality information; and transmitting the first radio signal with the first physical antenna and transmitting the second radio signal with the second physical antenna.

19. The non-transitory computer readable medium according to claim 18, wherein the method further comprises selecting the additional phase offset according to at least one criterion based on an average of the channel quality information received from the multiple user equipments.

20. A method of operating a Virtual Antenna Mapping (VAM) transmission system in a mobile communication network using multiple input, multiple output (MIMO) functionality, the VAM transmission system comprising a first transmission branch for transmitting a first radio signal by a first physical antenna and a second transmission branch for transmitting a second radio signal by a second physical antenna, the method comprising:

generating the first radio signal by taking a weighted sum of a primary data stream and a secondary data stream, using a first set of weights;

generating the second radio signal by taking a weighted sum of the primary data stream and the secondary data stream, using a second set of weights, wherein a phase offset is present between the first radio signal and the second radio signal;

performing a phase scan in steps and measuring channel quality information from multiple equipments operating in the mobile communication network for each of the steps;

adding an additional phase offset to at least one of the first radio signal and the second radio signal, the additional phase offset being selected according to at least one criterion based on the channel quality information received from the multiple user equipments during the phase scan, wherein the selected phase optimizes the at least one criterion; and transmitting the first radio signal with the first physical antenna and transmitting the second radio signal with the second physical antenna.

21. The method of claim 20, further comprising performing the phase scan until the average of the channel quality information is above a threshold value.

* * * * *